United States Patent [19]
Poincenot

[11] 3,931,979
[45] Jan. 13, 1976

[54] DEVICE FOR CLAMPING TOGETHER TWO MACHINE MEMBERS HAVING MATING CENTERING MEANS

[76] Inventor: Rene Poincenot, 32 Avenue Bosquet, Paris, France, 75007

[22] Filed: Apr. 26, 1974

[21] Appl. No.: 465,170

[30] Foreign Application Priority Data
May 17, 1973 France .............................. 73.17851

[52] U.S. Cl. ................................ 279/107; 90/11 A
[51] Int. Cl.² ...................... B23B 5/22; B23B 31/12
[58] Field of Search ..... 90/11 A; 408/238; 403/330, 403/325, 324, 322; 279/107, 106; 269/52, 48.1

[56] References Cited
UNITED STATES PATENTS

| | | | |
|---|---|---|---|
| 1,052,091 | 2/1913 | Robertson ............................ | 279/106 |
| 1,239,873 | 9/1917 | Bright ................................. | 279/106 |
| 2,739,361 | 3/1956 | Elsner ............................. | 403/322 X |
| 3,466,971 | 9/1969 | Meyer ................................. | 90/11 A |

*Primary Examiner*—J. M. Meister
*Assistant Examiner*—W. R. Briggs
*Attorney, Agent, or Firm*—Holman & Stern

[57] ABSTRACT

A device for clamping together two coaxial members having mutual mating centering means, such as a milling cutter in a rotary tool-carrying spindle, for instance. A plurality of hook shaped dogs are mounted for rocking movement on one of the members between an operative position in which they are engaged in a groove of the other member and an inoperative position in which they are located out of said groove. The dogs are provided with cam portions to be engaged by mating cam elements operatively connected to an annular operating part which is slidably movable axially with respect to the coaxial members for actuating the dogs.

2 Claims, 9 Drawing Figures

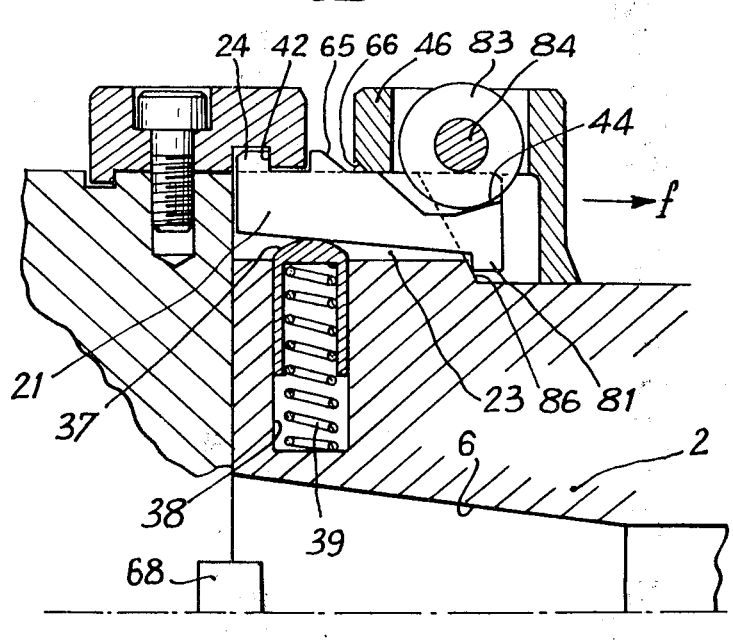
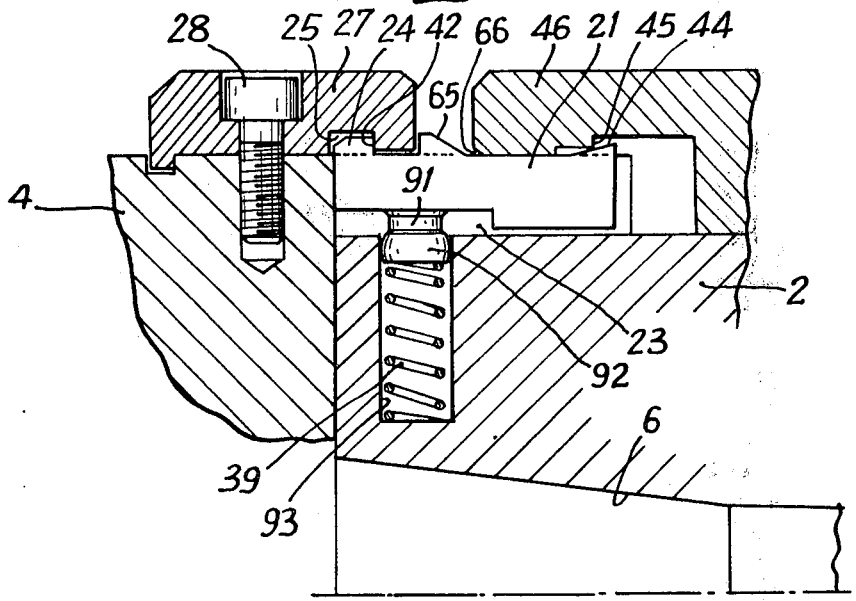

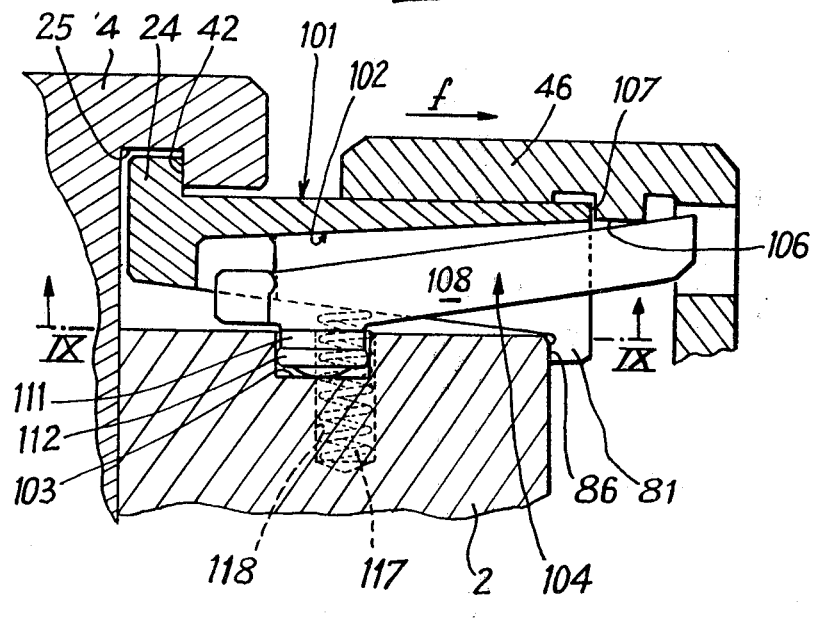
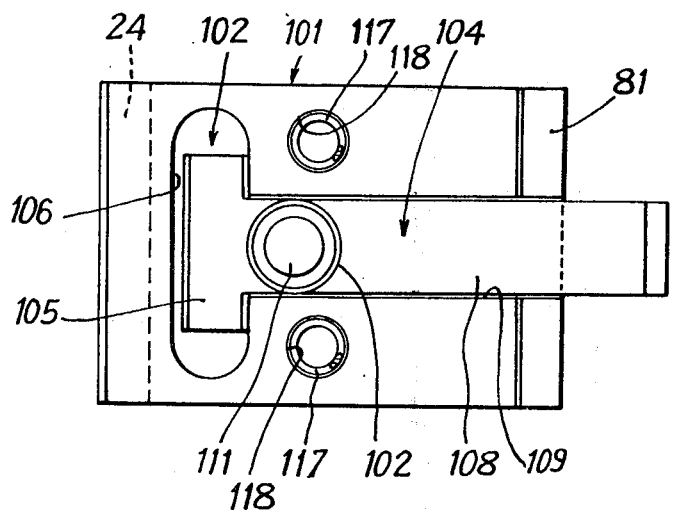

DEVICE FOR CLAMPING TOGETHER TWO MACHINE MEMBERS HAVING MATING CENTERING MEANS

BACKGROUND OF THE INVENTION

The invention relates to clamping together two coaxial members having mutual mating centering means as it relates principally to securing milling cutters of relatively large dimensions onto the nose of the tool-carrying spindle of a machine.

Up to now, milling cutters of large dimensions are secured on the nose of a spindle and clamped in position through a plurality of screws mounted in standard screw threaded holes bored into the spindle. Due to the fact that the number of such screws is at least equal to four, the operation is time-consuming and furthermore it is carried out manually, even in the case of highly elaborated automatic machines, such as for instance machining centers, which of course has a number of drawbacks, particularly when a milling cutter has to be mounted in the spindle of an automatic machine.

SUMMARY OF THE INVENTION

The aim of the invention is to provide a clamping device which has not the above cited drawbacks of the conventional clamping devices.

To this aim, the clamping device according to the invention comprises a plurality of hook-shaped dogs adapted to rock in radial planes on one of the two members to be clamped together, between an operative position in which they are engaged against the front face of a transverse groove of the other member and an inoperative position in which they are located out of said groove, such dogs being provided with axial retaining means cooperating with mating axial retaining means carried by the dog-carrying member, and also with cam portions capable of being engaged by mating cam elements operatively connected to an annular operating part movable axially on one of the aforesaid two members for actuating the dogs. When such a device is used for clamping a milling cutter on the nose of a machining center for example, an irreversible connection is provided which is quite rigid and unaffected by the vibrations caused by the cutting stresses, by virtue of the structure of the device which comprises rigid clamping dogs distributed along the periphery of the milling cutter. Such a device may be easily adapted for automatic mounting of milling cutters on the nose of a spindle.

A clearer understanding of the invention will be gained for a perusal of the following description and from a study of the accompanying drawings which show, by way of non limitative examples, a few embodiments of the invention.

BRIEF DESCRIPTION OF THE DRAWINGS

FIG. 8 is a longitudinal section of a further modification of the upper portion of FIG. 1, and FIG. 9 shows the dog and its clamping lever as seen from line IX—IX of FIG. 8.

DETAILED DESCRIPTION OF PREFERRED EMBODIMENTS

Figure 1:
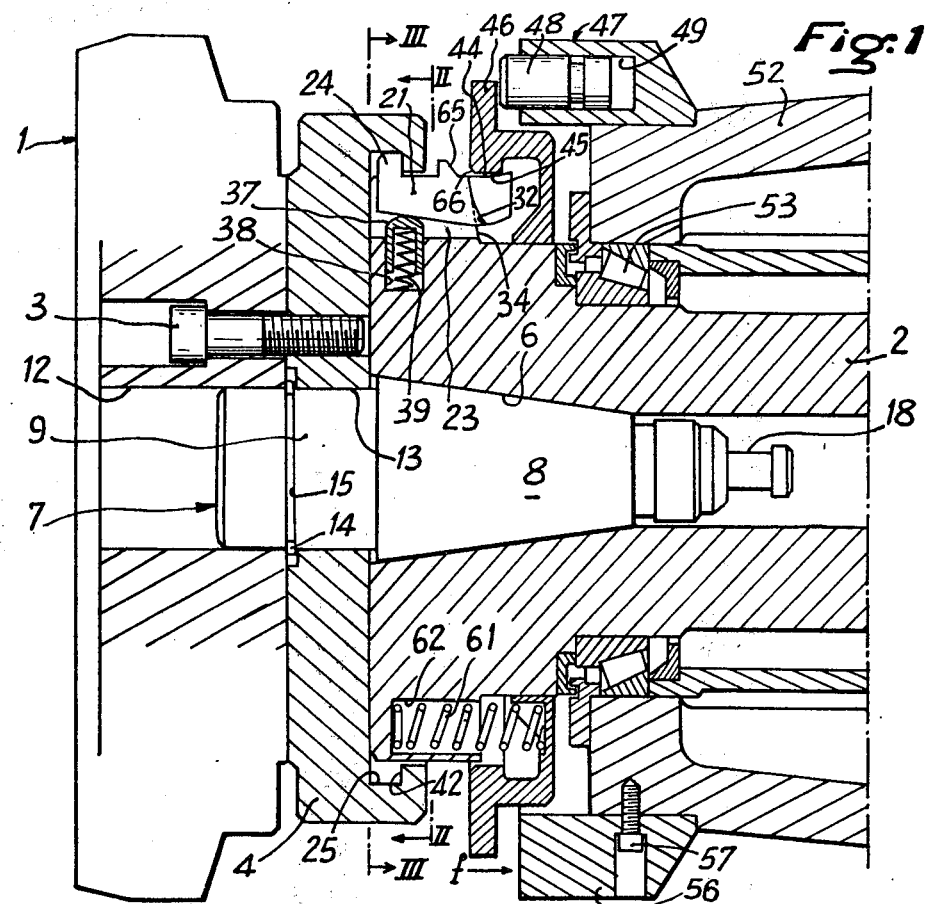
FIG. 1 shows a first embodiment in section made along the line I—I of FIG. 2.
Figure 2:
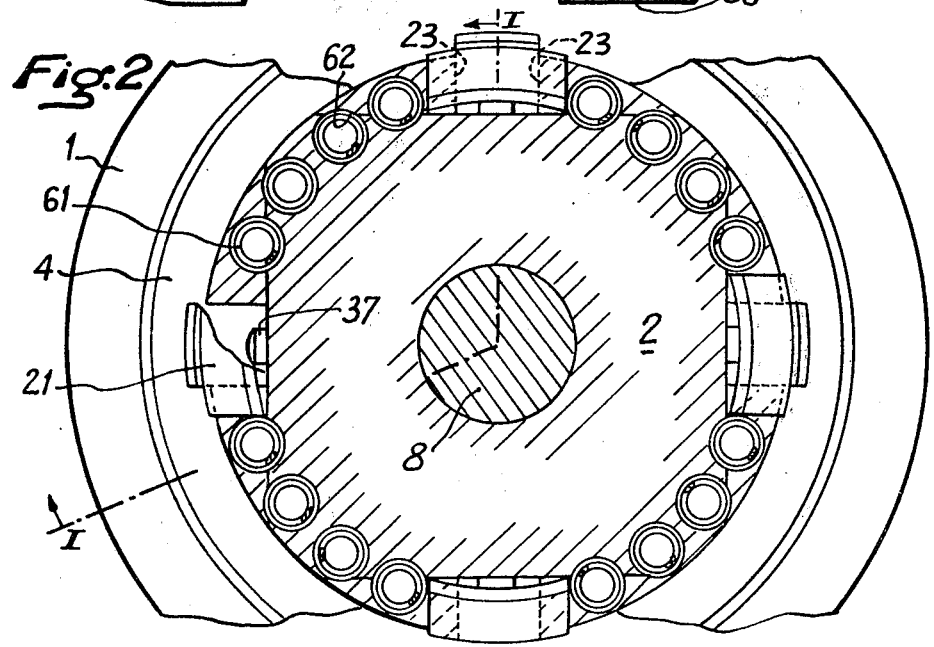
FIGS. 2 and 3 are cross-sections made respectively along the lines II—II and III—III of FIG. 1.
Figure 3:
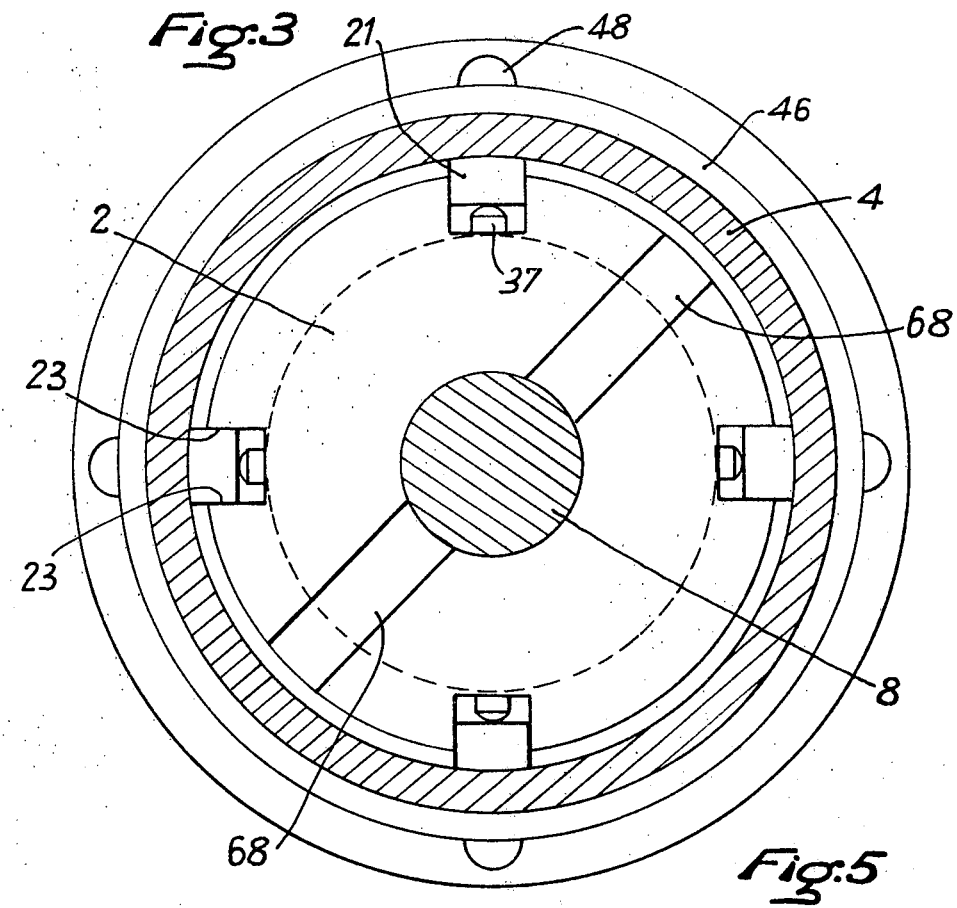

The device represented in FIGS. 1 to 3 has been designed for securing a milling cutter 1 to the nose of a rotary spindle 2 of a machine-tool. The milling cutter 1, in this example, is secured to a base 4 by means of screws 3. The milling cutter and base are centered in the taper bore 6 of the spindle 2 by means of a mandrel 7 which comprises a corresponding taper shank 8 and a cylindrical portion 9 engaged in the bores 12, 13 of the milling cutter and of its base where it is retained by a resilient wire 14 engaged partly within an annular groove 15 of said cylindrical portion 9 of the mandrel and partly between the milling cutter and its base. The inner end 18 of the taper shank 8 is of any conventional shape adapted to cooperate with usual means for clamping a tool within the nose of a spindle.

Figure 4:
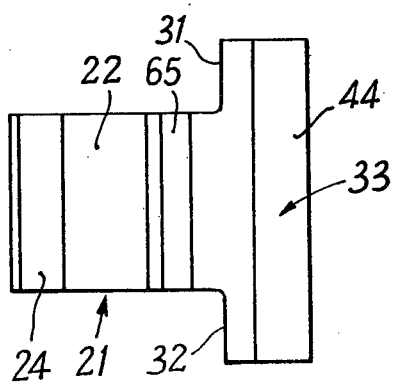
FIG. 4 is, on a larger scale, a plan view of one of the dogs of the device of FIGS. 1 to 3.

The device for clamping the milling cutter 1 through its base 4 on the nose of the spindle 2 comprises a plurality, namely four in this example, of dogs 21 (see also FIG. 4) generally T-shaped with the middle leg 22 of the "T" assuming a position which is substantially axial and being arranged in a corresponding longitudinal groove 23 cut in the nose of the spindle. The distal end of the middle leg 22 of the dog terminates in a hook portion 24 which, when in operative position, is housed in a transverse groove 25 cut in the base 4. As a modification, the transverse groove 25 could belong to fingers 27 (see also FIG. 7) regularly distributed about the base 4 and secured thereto by means of screws 28.

Each dog 21 is provided with axial retaining means constituted by the small faces 31, 32 of the transverse branch 33 of the T which bear against the corresponding front faces 34 of the longitudinal groove 23 of the nose of the spindle. In this example, the front face 34 is planar whereas the faces 31 and 32 of the dog are convex, as represented in FIG. 1.

Each dog 21 is urged radially outwardly so as to make its hook portion 24 engage into the groove 25 under the action of a piston 37 slidably mounted in a radial bore 38 of the nose of the spindle and subjected to the action of a helical compression spring 39.

Each hook portion 24 is forcibly urged against the front face 42 of the annular groove 25 of the base of the milling cutter by the fact that the opposite end of the dog has a cam portion 44 against which may bear a mating cam element 45 carried by an annular operating part 46 adapted to slide axially on the nose of the spindle 2, for instance under the action of small hydraulic cylinder and piston devices 47, the piston 48 of which bears against the annular operating part 46 while the cylinder 49 is secured to the quill 52 in which the spindle 2 is journalled, for instance by means of taper-roller antifriction bearings such as 53. In this example, the cylinders 49 are cut in a ring 56 secured to the shouldered quill 52 by means of screws 57. The annular operating part 46 is urged toward the right in FIG. 1, that is to say in the direction of the arrow $f$, by means of helical compression springs 61 one end of which is bearing against said part and the other end against the bottom of blind holes 62 bored axially into the nose of the spindle. The hydraulic cylinder and piston devices 47 operate, therefor, against the action of said springs.

Each dog 21 has a further cam portion 65 oppositely inclined with respect to the cam portion 44 and which may be engaged by a mating cam element 66 belonging to the annular operating part 46.

The nose of the spindle is provided with conventional means for positively rotating the milling cutter, said means being constituted by two keys 68 (FIG. 3) secured at mid-depth into two diametrical slots cut respectively in the facing sides of the base and of the nose of the spindle.

The operation of the device is as follows:

The device is shown, in clamped position, i.e. the hook portions 24 of the dogs 21 are for one part urged radially outwardly toward the bottom of the annular groove 25 of the base of the milling cutter by the springs 39 and for the other part strongly engaged against the front face 42 of said annular groove under the action of the axial springs 61 which urge the annular operating part 46 axially in the direction of the arrow $f$ in such a manner that its mating cam element 45 exerts a pressure against the wedge-shaped portion 32 of the dogs and urges the latter to rock in the direction which causes their hook portions 24 to bear heavily against the front face 42 of the groove 25. In this position, the hydraulic cylinder and piston devices 47, of course, are not supplied with pressure fluid.

When it is desired to remove the milling cutter, the hydraulic cylinder and piston devices 47 are energized so that their pistons 48 move the annular operating part 46 axially in the direction opposite to that of arrow $f$. In the first portion of the axial stroke of said operating part, the cam element 45 is first moved away from the corresponding cam portions 44 of the dogs and release the hook portions of said dogs which do not press any longer against the front side 42 of the annular groove 25. In the second portion of its axial stroke, the annular operating part 46 causes its cam element 66 to move the cam portions 65 of the dogs against the action of the radial restoring springs 39 so that the hook portions 24 of the dogs are moved inwardly out of the annular groove 25. After the portion 18 of the mandrel of the milling cutter has been disengaged from the usual retaining device, the milling cutter may then be removed in axial direction.

When it is desired to put the milling cutter into place, it is first presented on the nose of the spindle 2 by engaging its mandrel 8 into the taper bore 6 of the nose of the spindle, care being taken to position it angularly in such a manner that its driving diametrical slot correctly engages the keys 68 carried by the spindle 2. The hydraulic cylinder and piston devices 47 being energized, the dogs 21 are maintained in their inoperative position nearer the axis of the spindle so that the base 4 of the milling cutter may be pushed over the hook portions 24 of the dogs. The hydraulic cylinder and piston devices are then bled, thus causing annular movement of the operating annular part 46 in the direction of the arrow $f$ under the action of springs 61. In the first portion of such movement, the cam element 66 of the annular operating part releases the cam portions 65 of the dogs 21 so that the hook portions 24 of said dogs are engaged into the annular groove 25 of the base of the milling cutter, then in the second portion of the movement the cam element 45 presses against the cam portions 44 of the dogs and causes them to rock within the groove 23 of the spindle in the direction which causes the hook portions 24 to bear heavily against the front face 42 of the annular groove 25.

The angles of each cam are selected in such a manner that the connection between the milling cutter and the spindle through the dog is irreversible.

When the milling cutter is centered in the spindle through a mandrel, as represented, clamping of the mandrel within the spindle should be carried out prior to clamping the milling cutter.

The device is particularly applicable on an automatic machine, since placing the milling cutter may be carried out either by automatic feeding of the spindle-carrying headstock toward the milling cutter positioned on a table, or through a device adapted to bring the milling cutter against the nose of the spindle.

Instead of using an inner mandrel, centering of the milling cutter could be effected by reference with the outer cylindrical portion of the nose of the spindle.

Figure 5:
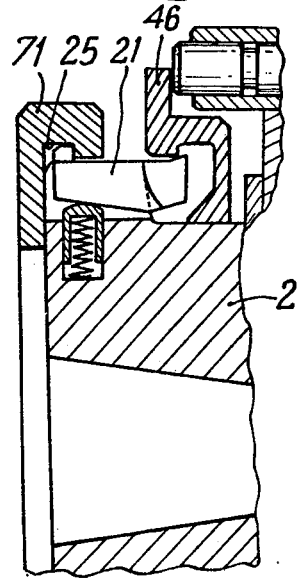
FIG. 5 is a side elevational view with parts broken away of a ring which may be mounted in place of a milling cutter on the nose of the spindle of a machine-tool, FIGS. 6 and 7, respectively, are longitudinal sections of two modifications of the upper portion of FIG. 1.

The principle of the device just described for securing a milling cutter by means of extremely rigid members distributed on the periphery of the milling cutter makes it possible to obtain a rigid and irreversible connection not liable to suffer from vibrations caused by the cutting stresses on the tool. When it is desired to use a tool mounted inside the nose of the spindle while no milling cutter is mounted on the spindle, then the milling cutter is replaced by a protecting ring 71 (FIG. 5) which is secured exactly in the same manner as the milling cutter and which ensures an immobilisation of the dogs and of the annular operating part with respect to the spindle while protecting the mechanism against any chip projections.

On FIG. 6, there is shown a modification with a dog 21 of a different shape, the axial retaining means being constituted by a heel 81 at the end of the dog remote from the hook portion 24. The dog has not a general T-shape and is made of a part with lateral parallel faces all over in sliding engagement against the sides of the longitudinal groove 23 in the spindle. The annular operating part is again designated 46 and it is provided with cam elements 66 which cooperate with cam portions 65 of the dogs. It also cooperates with the cam portions 44 of the dogs through a roller 83 mounted on a pin 84 of tangential direction. The heel 81 of each dog is engaged against a taper shoulder 86 of the spindle which forms a cam to ensure a strong jamming of the hook portion 24 of the dog against the front face 42 of the annular groove in the base of the milling cutter under the action of the movement of the annular operating part 46 in the direction of the arrow $f$ thus causing application of the roller 83 against the cam portion 44 of the dog. Axial shifting movement of the annular operating part 46 in a direction opposite to that of the arrow $f$ first causes releasing the dogs by moving the rollers 83 on the cam portions 44 of the dogs, then disengaging the hook portions 24 of the dogs by the action of the cam element 66 of the operating part against the cam portions 65 of the dogs, against the action of the springs 39.

In a further modification represented in FIG. 7, each dog 21 again has parallel faces, but its axial retaining means are constituted by a pin 91 ending in a bulged portion 92 in the shape of a spherical segment engaged in a radial cylindrical hole 93 having a diameter corresponding to that of the spherical segment and bored into the nose of the spindle 2. The hole 94 serves also as a receptacle for the restoring spring 39 which bears against the end portion of the buldged pin 91. Clamping effect is again ensured under the action of a cam element 45 of the annular operating part 46 which cooperates with a cam portion 44 of the dog, and unclamping is effected by the action of the cam element 66 of the operating part against the cam portion 65 of the dog.

In FIGS. 8 and 9, there is represented still a further modification in which each dog 101 has a longitudinal recess 102 cut into its inner face and having the general shape of a T in which is freely housed a clamping lever 104 of corresponding shape. The transverse branch 105 of the lever is, therefore, housed in the transverse branch 106 of the recess 102 and the longitudinal branch 108 of the lever is housed in the longitudinal branch 109 of the recess. Only the short faces of the transverse branch 105 of the clamping lever, which form the mating cam elements hereinabove referred to, are in engagement against the mating faces of the portion 106 of the recess which serve the purpose of the aforesaid cam portions of the dogs. The clamping lever 104 is provided with axial retaining means constituted by an extension 111 provided with a buldged portion 112 housed within the mating axial retaining means constituted by a blind hole 103 bored into the member 2 which carries the dog 101. The annular operating part 46 has an inner annular rib 106 which cooperates directly with the end portion 107 of the dog remote from the hook-shaped portion 24 of the dog and which cooperates also with the clamping lever 104. The dog 101 is permanently subjected toward its operating position, as shown, by two helical compression springs 117 housed within corresponding blind holes 118 of the memeber 2 and bearing against the inner face of the dog 101 on either side of the clamping lever 104.

The operation is as follows:

Upon the device being clamped, the springs 107 move the dog 101 upwardly so that its hook-shaped portion 24 engages into the groove 25, then the sliding movement of the annular operating part 46 in the direction of the arrow *f* forces the annular rib 106 against the top surface of the clamping lever 104 which rocks on its extension 111 located in the hole 103, while its transverse branch 105 exerts a pressure against the transverse brance 106 of the recess 102 of the dog while applying heavily the hook portion 24 of the dog against the face 42 of the groove 25. The sliding movement of the annular operating part 46 in the direction opposite to that of the arrow *f* first releases the clamping lever 104, then the annular rib 106 engages the end portion 107 of the dog and causes it to rock about its heel 81 bearing against the abutment face 86 of the member 2 as in the embodiment of FIG. 6, so that the hook-shaped portion 24 of the dog is released from the annular groove 25.

A device according to the invention may be used in further applications such as, for instance, clamping a rotary plate, clamping a lathe chuck or else securing any tool on the nose of a spindle.

Of course, the invention is not limited to the embodiments described and represented which were given solely by way of examples; many modifications may be adapted according to the applications contemplated without departing from the scope of the invention.

What is claimed is:

1. In an assembly of two coaxial members having mutual mating centering means, a clamping device comprising:

a plurality of dogs arranged on a first of said two members, each said dog having a hook-portion and being T-shaped with a middle leg having a distal end and with a transverse branch having two short faces, said middle leg assuming a position in a direction substantially axial, said hook portion being located at the distal end of said middle leg, means mounting said dogs for rocking movement in radial planes on said first member, a transverse groove in the second of said members, said groove having a front face, said dogs being adapted to assume through said rocking movement either an operative position in which said hook-portions of said dogs are engaged against said front face of said groove or an inoperative position in which they are positioned out of said groove, axial retaining means carried by each dog and constituted by said short faces of said transverse branch, mating axial retaining means carried by said first member and adapted to cooperate with said axial retaining means carried by said dogs, said mating axial retaining means being constituted by front supporting faces mating with said short faces, cam portions carried by said dogs, an annular operating part axially shiftable on one of said two members, and mating cam portions carried by said annular operating part and mating with said cam portions carried by said dogs for cooperating therewith so as to actuate said dogs upon axial shifting movement of said annular operating part.

2. A clamping device as defined in claim 1, wherein one of the faces constituted by each said front supporting face and the mating short face of said transverse branch is convex.

* * * * *